(12) United States Patent
Fox

(10) Patent No.: US 7,056,259 B2
(45) Date of Patent: Jun. 6, 2006

(54) EPICYCLIC GEAR SYSTEM

(75) Inventor: Gerald Fox, Massillon, OH (US)

(73) Assignee: The Timken Company, Canton, OH (US)

( * ) Notice: Subject to any disclaimer, the term of this patent is extended or adjusted under 35 U.S.C. 154(b) by 21 days.

(21) Appl. No.: 10/481,708

(22) PCT Filed: Jun. 24, 2002

(86) PCT No.: PCT/US02/20069

§ 371 (c)(1),
(2), (4) Date: Dec. 22, 2003

(87) PCT Pub. No.: WO03/002891

PCT Pub. Date: Jan. 9, 2003

(65) Prior Publication Data

US 2004/0235604 A1 Nov. 25, 2004

Related U.S. Application Data

(63) Continuation-in-part of application No. 09/894,665, filed on Jun. 28, 2001, now abandoned.

(51) Int. Cl.
*F16H 57/08* (2006.01)
(52) U.S. Cl. ........................................... 475/348
(58) Field of Classification Search ................ 475/348
See application file for complete search history.

(56) References Cited

U.S. PATENT DOCUMENTS

| | | | |
|---|---|---|---|
| 1,751,453 A | 3/1930 | Beemer | |
| 1,975,296 A | 10/1934 | Ross | |
| 2,728,240 A | 12/1955 | Stahlecker | |
| 3,178,966 A | 4/1965 | Wildhaber | |
| 3,303,713 A | 2/1967 | Hicks | |
| 3,330,171 A | 7/1967 | Nasvytis | |

(Continued)

FOREIGN PATENT DOCUMENTS

DE 682354 C 10/1939

(Continued)

OTHER PUBLICATIONS

ESTU-R-95 Report, "The 3MW Wind Turbine Project on Orkney 1981-1995", Jan. 1996, L A W Bedford e tal., Edited by Dr. D. I. Page.

*Primary Examiner*—Ha Ho
(74) *Attorney, Agent, or Firm*—Polster, Lieder, Woodruff & Lucchesi, L.C.

(57) ABSTRACT

An epicyclic gear system (A) has a sun gear (2), a ring gear (4) located around the sun gear, and planet gears (6) located between and engaged with sun and ring gears. In addition, it has a carrier (8) including a carrier flange (30) offset axial from the planet gears, carrier pins (34) projecting from the carrier flange into the planet gears, and bearings (72) between the planet gears and the carrier pins so that the planet gears rotate on the pins. Each bearing includes an inner race (46) having tapered raceways (56) presented away from the carrier pin, opposing tapered raceways (24) on the ring gear, and tapered rollers (70) organized rows between the raceways. Whereas the carrier pin is cantilevered from the carrier flange, the inner race is cantilevered from the carrier pin remote from the carrier flange, and this insures that the axes (Y) about which the planet gears rotate remain parallel to the central axis (X) of the system.

19 Claims, 3 Drawing Sheets

U.S. PATENT DOCUMENTS

| | | |
|---|---|---|
| 3,490,285 A | 1/1970 | Schaeffler et al. |
| 3,943,787 A | 3/1976 | Hicks |
| 3,964,334 A * | 6/1976 | Hicks .................... 475/347 |
| 3,983,764 A | 10/1976 | Hicks |
| 4,090,416 A | 5/1978 | Hicks |
| 4,104,932 A | 8/1978 | Hansson |
| 4,158,972 A * | 6/1979 | Chamberlain ........... 475/337 |
| 4,183,127 A | 1/1980 | Suzuki |
| 4,236,696 A | 12/1980 | Hicks et al. |
| 4,333,695 A * | 6/1982 | Evans .................... 384/562 |
| 4,571,227 A | 2/1986 | Colanzi et al. |
| 4,616,520 A | 10/1986 | Ehrlinger et al. |
| 4,621,026 A * | 11/1986 | Robinson ................. 428/422 |
| 4,700,583 A | 10/1987 | Hicks |
| 4,882,950 A | 11/1989 | Gausraub et al. |
| 4,961,485 A | 10/1990 | Huff et al. |
| 5,037,214 A * | 8/1991 | Dougherty ............... 384/571 |
| 5,102,379 A | 4/1992 | Pagluica et al. |
| 5,295,925 A | 3/1994 | Hirabayashi |
| 5,494,358 A | 2/1996 | Dougherty |
| 2003/0123984 A1 | 7/2003 | Wilde et al. |
| 2005/0075211 A1 | 4/2005 | Fox et al. |

FOREIGN PATENT DOCUMENTS

| | | | |
|---|---|---|---|
| DE | 2442588 A | 3/1976 | |
| DE | 1970668 A | 8/1998 | |
| EP | 0054280 A | 6/1982 | |
| JP | 58163848 | 9/1983 | |
| JP | 05-332407 | * 12/1993 | ............... 475/348 |
| JP | 10110789 | 4/1998 | |

* cited by examiner

EPICYCLIC GEAR SYSTEM

RELATED APPLICATIONS

This application derives and claims priority from International Application PCT/US02/20069, filed Jun. 24, 2002, and published under International Publication Number WO 03/002891 A1, and is a continuation-in-part of U.S. non-provisional application Ser. No. 09/894,665, filed Jun. 28, 2001, now abandoned.

TECHNICAL FIELD

This invention relates in general to gear systems and, more particularly, to an epicyclic gear system.

BACKGROUND ART

The typical epicyclic or planetary gear system basically has a sun gear provided with external teeth, a ring gear provided with internal teeth, and several planet gears located between the sun and ring gears and having external teeth which mesh with the teeth on the sun and ring gears. In addition to its gears, the typical system has a carrier to which the planet gears are coupled. Either the sun gear, the ring gear, or the carrier is held fast, while power is delivered to and taken from the remaining two components, and thus power is transferred through the planetary system with a change in angular velocity and an inverse change torque.

The sun and ring gears for all intents and purposes share the same axis, a central axis, while the planet gears revolve about radially offset axes that are parallel to the central axis—or at least they should be. Often the offset axes and the central axis are not parallel, and as a consequence the planet gears skew slightly between sun and ring gears. This causes excessive wear along the teeth of the planet, sun and ring gears, generates friction and heat, and renders the entire system overly noisy.

The problem certainly exists in straddle carriers. With this type of carrier the pins on which the planet gears rotate extend between two carrier flanges in which the pins are anchored at their ends. The carrier experiences torsional wind up which causes one carrier flange to rotate slightly ahead of the other flange. Not only does this skew the pin for each of the planet gears such that one end lies circumferentially ahead of the other end, but it also causes the leading end of the pin to dip toward the central axis and the other end to draw away from the central axis. The end result is a poor mesh between the planet gears and the sun and ring gears, and of course the friction, wear and noise associated with poorly meshed gears. To counteract this tendency, some planetary systems rely on gears that are wider than necessary and thus offer greater tolerance to skewing along the gear contact. But these systems can occupy excessive space and can be quite heavy.

Other transmissions rely on a double cantilever arrangement at the pins for their planetary gears to maintain the planet gears and the sun and ring gears properly meshed. In this arrangement the carrier has a single carrier flange located beyond the ends of the planet gears, and the carrier pins project from that flange into, and indeed through, the gears. Each carrier pin has one end anchored in the carrier flange and its other end anchored in a sleeve which turns back over the pin to support the planet gear. U.S. Pat. No. 3,303,713 to R. J. Hicks shows a double cantilevered arrangement. Often an antifriction bearing is fitted between the sleeve and the planet gear. But antifriction bearings consume space, making the planet gears excessively large in diameter, which in turn makes the entire gear system too large and heavy.

SUMMARY OF THE INVENTION

The present invention resides in an epicyclic gear system that has a sun gear, a ring gear around the sun gear and at least one planet gear located between and engaged with the sun and ring gears. A carrier flange is offset axially from the planet gear and a carrier pin projects from it into the planet gear. An inner race is attached to the carrier pin remote from the carrier flange, and it has a raceway which is presented toward a raceway carried by the planet gear. Rolling elements are organized in a row between the opposed raceways to enable the planet gear to revolve about the carrier pin. The invention also resides in a carrier and bearing for such a gear system.

BEST MODE FOR CARRYING OUT THE INVENTION

Figure 1:
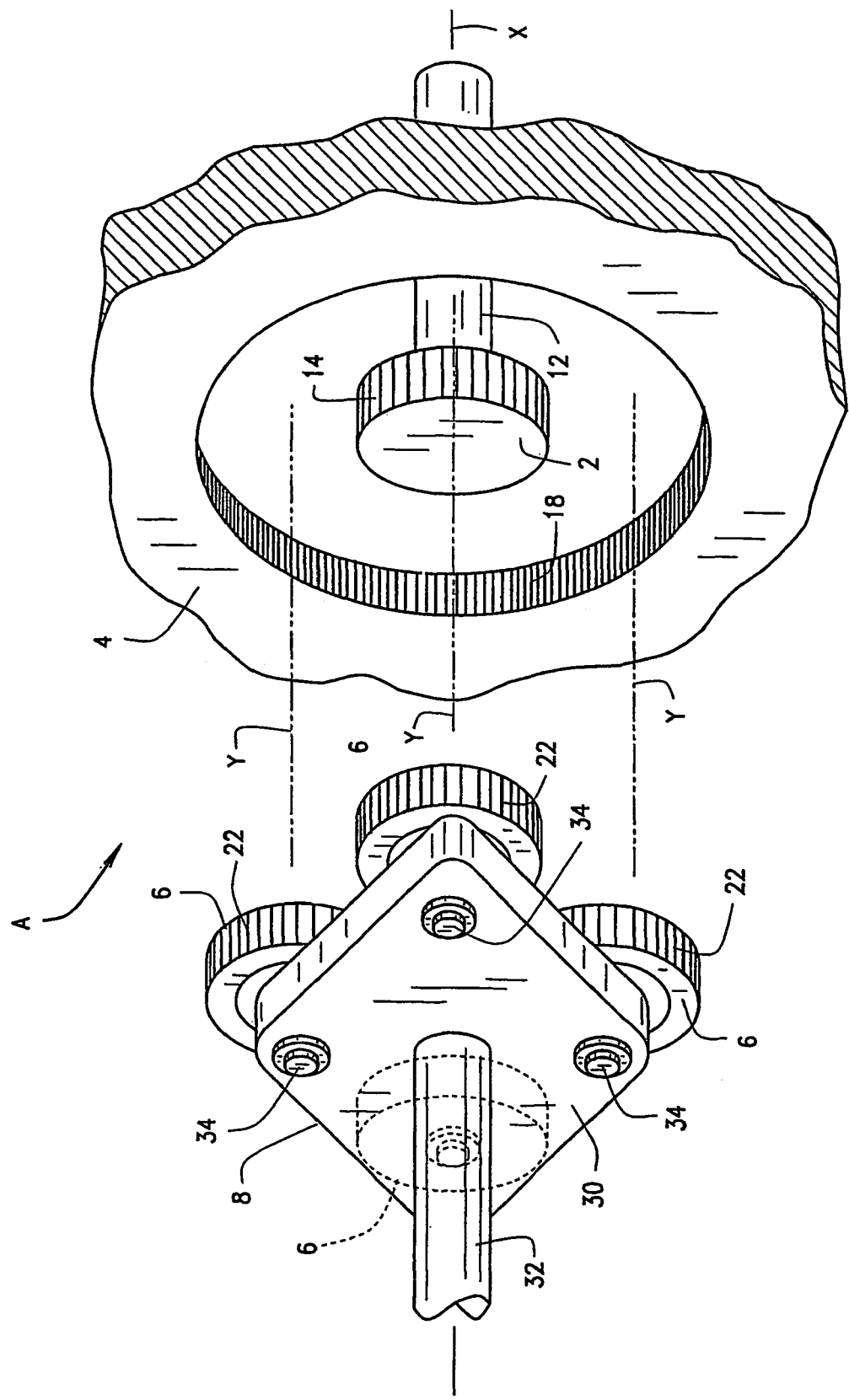
FIG. 1 is an exploded perspective view of an epicyclic gear system constructed in accordance with and embodying the present invention.

Referring now to the drawings, a planetary transmission A (FIG. 1), which is actually an epicyclic gear system, has the capacity to transmit power of considerable magnitude, given its size and weight. In short, it has a high power density. In contrast to some planetary transmissions, the transmission A relies on meshing gears that are quite narrow, yet the teeth of those gears remain properly meshed, even when transmitting substantial power and torque. The transmission A has a central axis X of rotation about which torque is transferred to the transmission A and delivered from it. The transmission A basically includes a sun gear 2 having its axis coincident with the central axis X, a ring gear 4 which surrounds the sun gear 2 and shares the axis X with it, and planet gears 6 which mesh with and rotate between the sun and ring gears 2 and 4 about axes Y that are offset radially from, yet parallel to, the central axis X. In addition, the transmission A has a carrier 8 to which the planet gears 6 are coupled, and the carrier 8 likewise shares the central axis X.

Referring more specifically to the sun gear 2, it is attached to a shaft 12 or some other supporting structure with which it normally rotates, but it may be fixed against rotation in some installations. The sun gear 2 has external teeth 14 which are presented outwardly away from the axis X.

The ring gear 4 is typically fixed, and thus does not rotate, although it may rotate in some installations. In any event, the ring gear 4 has internal teeth 18 which are presented inwardly toward the axis X and toward the external teeth 14 on the sun gear 2 and lie concentric with them. The ring gear 4 may be part of or integrated into a housing for the transmission A.

An annular space exists between the sun and ring gears 2 and 4, and the planet gears 6 occupy that space. Each has external teeth 22 which mesh with the external teeth 14 or the sun gear 2 and the internal teeth 18 on the ring gear 4.

Thus, when the sun gear 2 rotates relative to the ring gear 4 about the axis X or vice versa, the planet gears 6 will revolve, each about its offset axis Y that lies parallel to the central axis X. The planetary gears 6 are hollow, with each having two raceways 24 (FIG. 2) which taper downwardly to an intervening surface 26 located midway between the ends of the gear 6. The large ends of the raceways 24 for each planet gear 6 open out of the ends of the gear 6.

The carrier 8 includes (FIG. 1) a carrier flange 30 to which all of the planet gears 6 are coupled, it being offset axially beyond corresponding ends on each of the gears 6. Normally, the carrier 8 rotates about the axis X, although it may remain fixed in some installations. When the carrier 8 rotates, it is usually coupled to a shaft 32 that lies along the axis X. In addition to the carrier flange 30, the carrier 8 has carrier pins 34 which project from the flange 30 into the planet gears 6, their axes generally corresponding to the axes Y of rotation for the planet gears 6.

Figure 2:
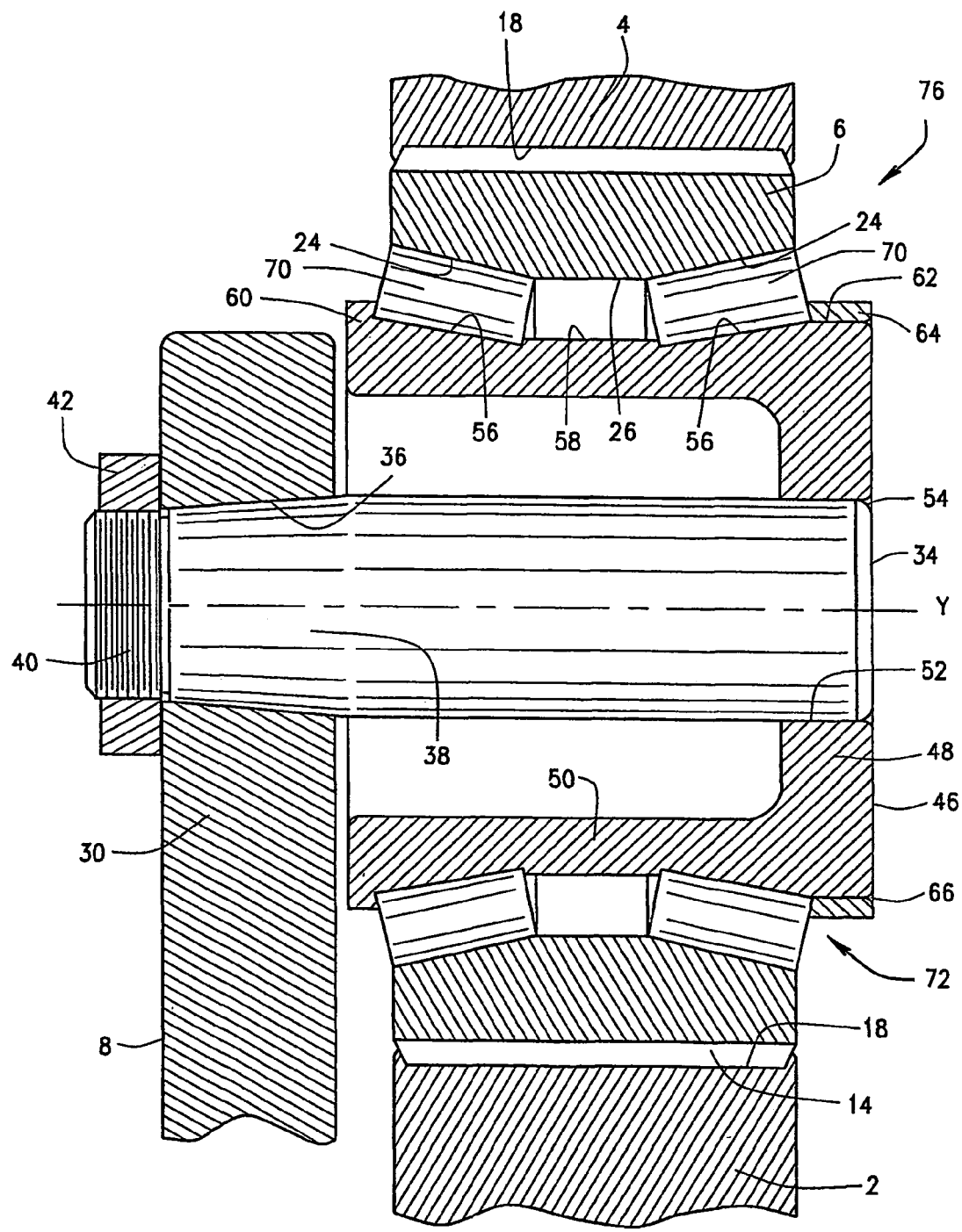
FIG. 2 is a sectional view of the gear system at one of its planet gears and showing the coupling between the planet gear and the carrier.

More specifically, the carrier flange 30 opposite each planet gear 6 has a tapered hole 36 (FIG. 2). The carrier pins 34, on the other hand, have tapered surfaces 38 which lead out to threaded ends 40. The tapered surfaces 38 conform in configuration to the tapered holes 36 in the flange 30 and indeed fit snugly into the tapered holes 36 so that the pins 34 project from the face of the carrier flange 30 that is presented toward the planet gears 6. The threaded ends 40 project beyond the other face of the carrier flange 30 where they are engaged by nuts 42 which are turned down snugly against that face. This lodges the carrier pins 34 at their tapered surfaces 38 firmly in the carrier flange 30. Thus, each pin 34 is, in effect, cantilevered from the carrier flange 30.

Each carrier pin 34 projects through its planet gear 6, and at the opposite end of the gear 6, that is the end remote from the carrier flange 30, is fitted to an inner race 46 which the planet gear 6 also encircles. The inner race 46 has an end wall 48 and a sleeve 50 formed integral with the end wall 48. Indeed, the sleeve 50 turns backwardly from the end wall 48 into the interior of the gear 6 and thus encircles the carrier pin 34. The end wall contains a bore 52 into which the end of the carrier pin 34 fits with an interference fit. At its very end the carrier pin 34 is joined to the end wall 48 along a weld 54. Thus, the interference fit together with the weld 54 secure the inner race 46 firmly to the carrier pin 34. The interior surface of the sleeve 50 is somewhat larger than the carrier pin 34, and as a consequence the inner race 46 at its end wall 48 is cantilevered from the remote end of the carrier pin 34.

The sleeve 50 of the inner race 46 lies within the interior of the planet gear 6 and has two tapered raceways 56 which taper downwardly to a separating rib 58. The raceways 56, which have their centers along the axis Y, are presented outwardly away from the axis Y and toward the raceways 24 on the gear 6, each raceway 56 on the inner race 46 being opposite one of the raceways 24 on the gear 6. On the other hand, the separating rib 58 lies opposite the intervening surface 26 of the gear 6. Each raceway 56 on the inner race 46 tapers in the same direction as the raceway 24 toward which it is presented on the planet gear 6. The raceway 56 closest to the carrier flange 30 leads out to a thrust rib 60 that is formed integral with the sleeve 50 of the inner race 26. The other raceway 56 leads out to a cylindrical mounting surface 62 that surrounds the end wall 48. The mounting surface 62 has a rib ring 64 fitted to it with an interference fit and further secured with a weld 66 at its end. The rib ring 64 extends axially from the weld 66 to the large end of the tapered raceway 56, so the rib ring 64 forms another thrust rib, similar in function to the rib 60 at the end of the inner race 46 that is remote from the carrier flange 30.

The annular region between each planet gear 6 and inner race 46 that the gear 6 surrounds is occupied by rolling elements in the form of tapered rollers 70 organized into two rows. One row lies along the integral thrust rib 60 that is adjacent to the carrier flange 30 and contacts the opposed raceways 24 and 56 at that end, while the other row lies along the rib ring 64 that surrounds the end wall 48 of the inner race 46 and contacts the raceways 24 and 56 at that end. Indeed, the tapered rollers 70, which are formed from a bearing-grade steel, contact the raceways 24 and 56 along their tapered side faces, there being generally line contact here. They also bear against the thrust rib 60 and rib ring 64 at their large end faces. The thrust rib 60 and rib ring 64 prevent the rollers 70 from moving up the raceways 24 and 56 and being expelled from the annular region between the planet gear 6 and the inner race 46. The rollers 70 of each row are on apex, meaning that the conical envelopes in which the side faces of the rollers 70 of a row lie will have their apices located at a common point along the axis Y. This produces pure rolling contact between the side faces of the rollers 70 and the raceways 24 and 56. While the rollers 70 of each row may be separated with a cage, preferably they are not so confined. This enables each row to contain the maximum number of rollers 70.

A cage, of course, will separate the rollers 70 of a row, so that they do not contact each other. But when the cage is eliminated, adjacent rollers 70 can contact each other along their tapered side faces. To retard metal adhesion at contacting side faces, the rollers 70 along at least their tapered side faces should have a tribological coating that retards adhesion or at least every other roller 70 should have such a coating in it. One suitable coating includes particles of noncrystalline metal carbide and an amorphous hydrocarbon matrix in which the particles are embedded. The tribological coating may be applied to the rollers 70 by physical vapor deposition, by chemical deposition, or by a combination of the two. U.S. patent application Ser. No. 10/114,832, filed 2 Apr. 2002, for the invention of G. Doll and G. Fox entitled "Full Complement Antifriction Bearing", which invention is assigned to The Timken Company, discloses other tribological coatings which will suffice for the rollers 70 and procedures for applying them. That application is incorporated herein by reference.

The rollers 70 together with the inner race 46 and the raceways 24 on the planet gear 6 form a double row tapered roller bearing 72 that couples the planet gear 6 to the carrier pin 34 about which the gear 6 rotates. Indeed, the bearing 72 has the capacity to facilitate rotation of the planet gear 6 about the axis Y with minimal friction, while confining the gear 6 radially and axially on the carrier pin 34. In other words, the bearing 72 takes thrust loading in both axial directions. Moreover, the bearing 72 is set to a condition of light preload, and as a consequence no axial or radial clearances exist within it. This enables the gear 6 to rotate on the carrier pin 34 without axial or radial free motion and without wobbling.

The carrier pins 34 possess a measure of flexibly and indeed will flex well within their elastic limits when torque is transferred through the planet gears 6. The double cantilever arrangement enables the axes Y to remain parallel to the axis X and hence the planet gears 6 remain properly meshed with the sun and ring gears 2 and 4. Thus, the planet gears 6, and likewise the sun and ring gears 2 and 4, need not be excessively wide to account for off-center gear contact.

To assemble the carrier 8, each carrier pin 34 at its cylindrical end is forced into the bore 52 in the carrier flange 48 of the inner race 46 for that pin 34. Then the carrier pin 34 at its end is welded to the end wall 48, producing the weld 54. Thereupon, the rollers 70 for the row remote from the end wall 48 are placed along the raceway 56 that leads up to the thrust rib 60, with the large end faces of those rollers being 70 against the rib 60. Next the planet gear 6 is installed over the inner race 46 and the row of rollers 70 on that race 46. The leading raceway 24 in the gear 6 seats against the side faces of those tapered rollers 70. This leaves an annular void between the raceways 24 and 56 at the opposite end planet gear 6. More rollers 70 are inserted into this void with their small ends leading, thus creating a second row of rollers 70 having their large ends located along the end of the mounting surface 62 for inner race 46. With the gear 6 and the two rows of rollers 70 in place around the inner race 46, the rib ring 64 is forced over the mounting surface 62 on the inner race 46, and advanced toward the large ends of the rollers 70 that are at the mounting surface 62. As the rib ring 64 approaches the large end faces of the rollers 70, the gear 6 is rotated to insure that the rollers 70 of the two rows seat against the raceways 24 and 56 and along the thrust rib 60 and rib ring 64. After the rib ring 64 comes against the large end faces of the rollers 70 in the row that is along it, the bearing 72 will enter preload. The advance continues a short distance until the bearing 72 acquires the proper preload. Then the rib ring 64 is welded to the inner race 46, producing the weld 66. The gear 6, rollers 70, inner race 46 and carrier pin 34 constitute a subassembly 76, and enough subassemblies 76 are produced in the foregoing manner to complete the carrier 8.

Within each subassembly 76 the tapered surface 38 of the carrier pin 34 extends beyond the open end of the sleeve 50 for the inner race 46 and beyond the corresponding end of the planet gear 6 as well. The tapered surface 38 of the carrier pin 34 is inserted into one of the tapered holes 36 of the carrier flange 30, whereupon one of the nuts 42 is engaged with the threaded end 40 that projects out of the flange 30. The nut 42 is turned down firmly against the carrier flange 30 to draw the tapered surface 38 of the carrier pin 34 snugly into the tapered hole 36. This secures the carrier pin 34 and inner race 46 firmly to the carrier flange 30. The remaining subassemblies 76 are installed on the carrier flange 30 in a like manner.

With the carrier 8 so assembled, it is installed over the sun gear 2 and into the ring gear 4 such that the external teeth 22 on the planet gears 6 engage the external teeth 14 in the sun gear 2 and the internal teeth 18 on the ring gear 4.

When torque is applied to the shaft 12 to rotate the sun gear 2, the planet gears 6 revolve and move along the ring gear 4, thus imparting rotation to the carrier 8 and the shaft 32 extended from it. The angular velocities of the two shafts 12 and 32 differ and with that difference a change in the torque ensues. Of course, the torque may be applied to the shaft 32 and taken from the shaft 12. Actually, any one of the sun gear 2, ring gear 4 and carrier 8 may be held fast and torque delivered to and taken from the remaining two components.

Figure 3:
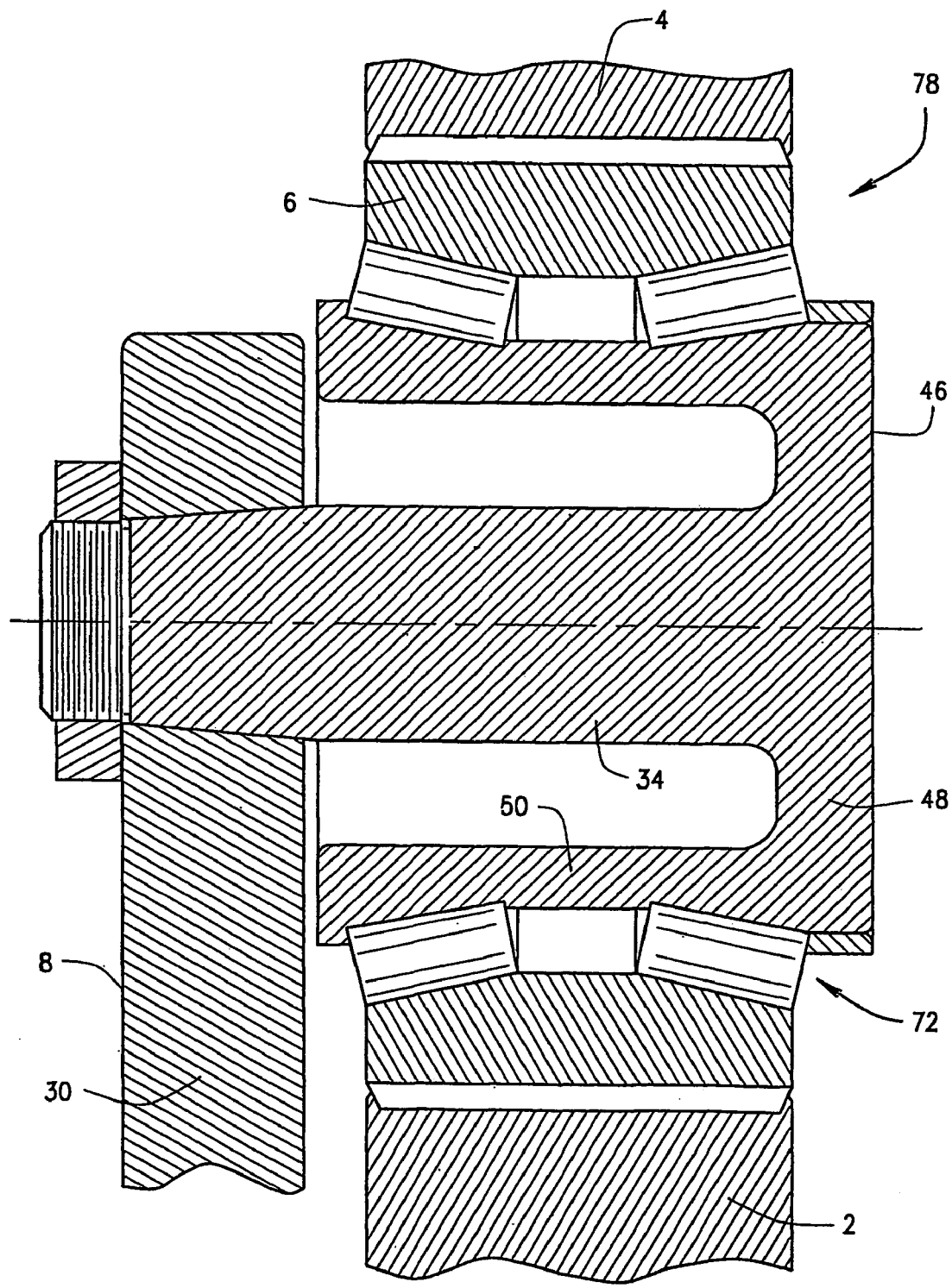
FIG. 3 is a sectional view of the gear system similar to the system of FIG. 2, but showing a modified coupling.

In a modified subassembly 78 (FIG. 3) the carrier pin 34 is formed integral with the inner race 46.

The cantilever of the carrier pins 34 from the carrier flange 30 and the cantilever of the inner races 46 from the carrier pins 34, that is the so-called "double cantilever", insures that the axes Y of rotation for the ring gears 6 remain parallel to the center axis X. As a consequence, the ring gears 6 do not require excessive width to resist skewing. The inner races 46, being mounted directly on the carrier pins 34, instead of on intervening components, together with the integration of the outer raceways 24 into the planet gears 6, enables the bearings 72 to be of a diameter that is smaller than the diameters of bearings in more conventional epicyclic gear systems. This, in turn, can permit use of smaller sun and ring gears 2 and 4, and otherwise render the entire transmission highly compact and light in weight.

In lieu of a double row tapered roller bearing 70, each planet gear 6 may be coupled to its carrier pin 34 on the carrier 8 with a double row angular contact ball bearing or even with a cylindrical or spherical roller bearing. Also, more or less than four planet gears 6 may be used between the sun gear 2 and ring gear 4.

The invention claimed is:

1. An epicyclic gear system having a central axis and comprising:
   a sun gear located along the central axis;
   a ring gear located around the sun gear and also along the central axis;
   planet gears located between and engaged with the sun and ring gears for rotation about offset axes that are spaced from the central axis; each planet gear carrying first and second outer raceways which taper downwardly toward each other so that they have their least diameters where they are closest; and
   a carrier coupled with the planet gears, the carrier including a flange and pins projecting from the flange into the planet gears, there being a separate pin for each planet gear, each pin at one of its ends being cantilevered from the carrier flange, the carrier also including an inner race on each pin with the inner race being cantilevered from its pin remote from the flange and including a sleeve that extends into the planet gear for the pin where it is spaced from the pin, the sleeve having first and second inner raceways which are presented toward and taper in the same direction as the first and second outer raceways, respectively, the sleeve also having a thrust rib projecting beyond the large end of the first inner raceway and a mounting surface at the large end of the second inner raceway, the inner race also including an initially separate rib ring located against the mounting surface of the sleeve such that the rib ring projects beyond the large end of the second raceway for the inner race;
   first tapered rollers arranged in a row between the first raceway for each planet gear and inner race, with their large ends being against the thrust rib; and
   second tapered rollers arranged in a second row between the second raceways for each planet gear and inner race and having their large ends against the rib ring.

2. A gear system according to claim 1 wherein each inner race also includes an end wall to which the sleeve for that inner race is attached, and the inner race is cantilevered from its pin at the end wall.

3. A gear system according to claim 2 wherein the sleeve and end wall for each inner race are formed integral.

4. A gear system according to claim 2 wherein the pin and the end wall for the inner race on that pin are formed integral.

5. A gear system according to claim 1 wherein the thrust rib for each inner race is formed integral with the sleeve for that inner race.

6. A gear system according to claim 5 wherein the thrust rib for each inner race is located closer to the carrier flange than the rib ring for that inner race.

7. A gear system according to claim 6 wherein the second raceway for each inner race is located in part around the location at which that inner race is cantilevered from its pin.

8. A gear system according to claim 1 wherein the mounting surface is cylindrical and the rib ring fits around the mounting surface.

9. A gear system according to claim 8 wherein the mounting surface and rib ring surround the location at which the inner race is cantilevered from the pin.

10. A gear system according to claim 1 wherein the rollers of each row are capable of contacting each other; and wherein at least some of the rollers in each row are covered with a tribological coating capable of retarding metal adhesion.

11. An epicyclic gear system having a central axis; said gear system comprising:
a sun gear located along the central axis;
a ring gear located around the sun gear and also along the central axis;
planet gears located between and engaged with the sun and ring gears for rotation about offset axes that are spaced from the central axis, each planet gear carrying an outer raceway that is presented inwardly toward its offset axis;
a carrier coupled with the planet gears and including a flange and pins projecting from the flange into the planet gears, there being a separate pin for each planet gear, each pin at one of its ends being cantilevered from the carrier flange, the carrier also including an inner race located between each planet gear and the pin which projects into that planet gear and having an inner raceway which is presented outwardly toward the outer raceway carried by the planet gear, the inner race being cantilevered from its pin remote from the flange, but otherwise being spaced from the pin, with the location where the inner race is cantilevered from the pin being surrounded in part by the inner raceway; and
rolling elements arranged in a row between the outer and inner raceways for each planet gear and inner race and also being located in part around the location where the inner race is cantilevered from the pin.

12. A gear system according to claim 11 wherein the row of the rolling elements between each planet gear and inner race is one of two rows, with one row being closer to the flange than the other row; and wherein only a portion of said other row surrounds the location at which the inner race is cantilevered from the pin.

13. A gear system according to claim 11 wherein the rolling elements of each row are capable of contacting each other; and wherein at least some of the rolling elements of each row are covered with a tribological coating capable of retarding metal adhesion.

14. An epicyclic gear system having a central axis and comprising:
a sun gear located along the central axis;
a ring gear located around the sun gear and also along the central axis;
planet gears located between and engaged with the sun and ring gears for rotation about offset axes that are spaced from the central axis;
a carrier flange located beyond the planet gears;
carrier pins projecting from the carrier flange into the planet gears, there being a separate pin for each planet gear, with each pin being cantilevered from the carrier flange;
and a bearing between each pin and the planet gear into which the pin projects, each bearing including: first and second outer raceways on the planet gear where they are inclined oppositely with respect to the offset axis for the planet gear and presented inwardly toward the axis; an inner race located within the planet gear and around the pin, the inner race being attached to the pin remote from the flange and projecting toward the flange from the location of the attachment of the inner race to the pin, beyond which the inner race is spaced from the pin, whereby the inner race is cantilevered from the pin, the inner race having first and second inner raceways which are inclined with respect to the offset axes, with the first inner raceway being inclined in the same direction as the first outer raceway and the second inner raceway being inclined in the same direction as the second outer raceway, whereby the first and second inner raceways are inclined oppositely, first rolling elements arranged in a row between the first outer and inner raceways and second rolling elements arranged in a row between the second outer and inner raceways, the bearing being in a condition of preload so that no clearances exist between the rolling elements and the raceways.

15. A gear system according to claim 14 wherein the raceways are tapered and the rolling elements are tapered rollers.

16. A gear system according to claim 15 wherein the outer raceways taper downwardly toward each other so that they are closest at their least diameters, wherein the inner raceways taper downwardly toward each other so that they are closest at their least diameters, and the tapered rollers of the first row have their large ends presented away from the tapered rollers of the second row and vice versa.

17. A gear system according to claim 16 wherein the inner race includes a sleeve which is spaced from the pin, and the first and second inner raceways are on the sleeve; wherein the sleeve has a thrust rib that projects outwardly beyond the large end of its first inner raceway; wherein the inner race also includes an initially separate rib ring that is attached to the sleeve and projects beyond the large end of the second inner raceway; wherein the large ends of the tapered rollers in the first row are against the thrust rib and the large ends of the tapered rollers in the second row are against the rib ring.

18. A gear system according to claim 17 wherein the sleeve of the inner race has a mounting surface that extends axially beyond the large end of the second inner race at a diameter not exceeding the diameter of that large end, and the rib ring fits around the mounting surface.

19. A gear system according to claim 14 wherein the rolling elements of each row are capable of contacting each other; and wherein at least some of the rolling elements are covered with a tribological coating capable of retarding metal adhesion.

* * * * *